United States Patent [19]

Banks et al.

[11] Patent Number: 4,976,871

[45] Date of Patent: Dec. 11, 1990

[54] METHOD OF MONITORING FLOCCULANT EFFECTIVENESS

[75] Inventors: Rodney H. Banks; Jitendra T. Shah, both of Naperville, Ill.

[73] Assignee: Nalco Chemical Company, Naperville, Ill.

[21] Appl. No.: 422,618

[22] Filed: Oct. 17, 1989

[51] Int. Cl.$^5$ .............................................. C02F 1/52
[52] U.S. Cl. .................................... 210/709; 210/96.1; 210/94; 250/564; 250/573; 356/442
[58] Field of Search ............. 210/702, 709, 732, 96.1, 210/94; 250/564, 573; 356/338, 442

[56] References Cited

U.S. PATENT DOCUMENTS

| | | | |
|---|---|---|---|
| 4,752,131 | 6/1988 | Eisenlaver et al. | 250/564 |
| 4,783,269 | 11/1988 | Baba et al. | 210/96.1 |
| 4,867,886 | 9/1989 | Botkins | 210/709 |
| 4,891,519 | 1/1990 | Nohira et al. | 250/573 |
| 4,917,496 | 4/1990 | Sommer | 356/338 |

Primary Examiner—Peter Hruskoci
Attorney, Agent, or Firm—Kinzer, Plyer, Dorn, McEachran & Jambor

[57] ABSTRACT

Continuous monitor to determine effective performance of a flocculant used to dewater a sludge stream, in which a voltage waveform of water clarity, generated by a sensor opposed to a light beam transmitted across the stream, is digitized by a comparator; the comparator is insensitive to sludge flow rate.

6 Claims, 2 Drawing Sheets

METHOD OF MONITORING FLOCCULANT EFFECTIVENESS

This invention relates to an on-line method of continuously monitoring flocculant effectiveness, for correction if needed, and in particular to a method by which clarified water spaces between agglomerates are in effect counted in a moving aqueous sludge stream.

BACKGROUND; PRIOR PRACTICE

The aqueous stream is typically a municipal, raw sewage sludge or an industrial waste, delivered from a sludge tank through piping to dewatering equipment, usually a belt press. The phenomenon is classified as solids-liquid separation. To aid in separating the solid matter, a flocculant is added downstream of the sludge tank to cause fine particles to collect together as much larger and denser agglomerates resulting in higher cake solids following dewatering. The flocculants are known polymers; see *The Nalco Water Handbook*, Second Edition Frank N. Kemmer, McGraw-Hill Book Company, 1988.

It can be readily visualized that the effectiveness of the flocculant will be proportional to the amount of clarified water downstream of the point where the flocculant is added, just before the sludge stream reaches the dewatering equipment. By measuring effectiveness, the polymer feed-rate can be adjusted for optimum treatment.

Flocculant effectiveness in two-phase aqueous suspensions or dispersions has heretofore been measured by taking the root mean square (RMS) of a voltage waveform produced by particles modulating a light source of the stream clarity. The highest voltage wave crest occurs when the beam is strongest (between particles) and lowest when the light is blocked because of an interdicting opaque agglomerate. To do this, a high intensity light beam originated by a probe on one side of the piping is transmitted across the sample stream and aimed at an opposed probe on the opposite side which incorporates an optical transducer. The transducer transforms the intensity of the beam of light into a voltage analog waveform. An RMS-to-DC converter chip then extracts the RMS voltage of the wave and emits a proportional D.C. voltage as a value proportional to the degree of flocculation. U.S. Pat. No. 4,752,131 is typical.

OBJECTS AND SUMMARY OF THE INVENTION

One problem with the measurement just described is that the waveform may be compressed in amplitude by turbidity which may not be due to an inefficient flocculant treatment, but may be due to natural turbidity requiring no treatment at all. One object of the present invention is to circumvent this problem.

The stream does not always have the same rate, because the pump rate may vary. It is a known fact that the RMS-to-DC converter is frequency dependent, and hence a very low flow rate can give a false or inaccurate reading if the integrating capacitor is not properly set. Another object of the invention is to circumvent this problem by so digitizing the waveform values that flow rate changes are inconsequential.

Other objects of the invention are to make provision for on-stream cleansing of the windows of the light probe and detector probe in contact with the sludge stream, and also to have the probes adjustable s that they may be separated by an optimum short distance regardless of the diameter of the pipe to which they are mounted, which may vary in the order of 2" to 12", more or less.

Under the present invention, we also employ a beam of high intensity light and optical detector opposed thereto to generate a voltage analog waveform, but we employ that voltage analog waveform in such a way as to digitize (actual count of) the clear water areas between agglomerates, and in doing so we interpose a comparator biased by a low threshold voltage so that inconsequential turbidity will not feature in the read-out as in the RMS method. More specifically, the analog voltage is transmitted to a comparator having a low voltage threshold voltage (bias) so that its output will only be a series of discrete pulses, which exceed the bias voltage. These output pulses from the comparator are unbiased by any natural turbidity present. Pulses (HI) are sent to an AND gate along with clock pulses (HI) so that there is a digital (actual count) read-out per unit of time when there is a HI-HI coincidence at the AND gate. The digital read-out therefore represents the amount of clear water areas passing the light beam per unit of time. The digital read-out value is strictly proportional to effectiveness of the flocculant, that is, the higher the reading, the more so the sludge particles have been agglomerated to "release" clarified water. Flow rate changes are inconsequential since there is no chip and no capacitor which has to be frequency optimized, and since the ratio of clear water areas is not a function of flow rate.

Another summary statement of the invention is that we present a digital pulse counting method gated by an optical detector output. When the detector senses the quality of the light beam, an asynchronous clock is counted. When the beam is obscured due to opaque sludge particles, the clock pulses are not counted nor is a state of turbidity counted; after a constant time interval, the total number of recorded clock pulses will be proportional to the relative degree of flocculation, and the result may require a change in the polymer (flocculant) dosage.

THE DRAWING

Description of the Preferred Embodiment

Figure 1:
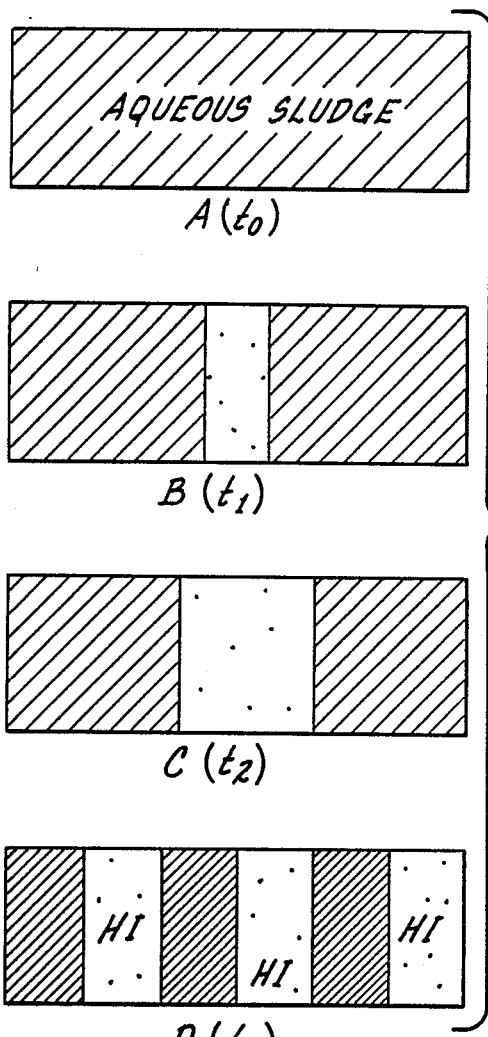
FIG. 1 is a diagram showing progressive action of a flocculant applied to a sludge stream.

There will first be reference to FIG. 1 which diagrams progressive action of the polymeric flocculant on a time span progressive action of the polymeric flocculant on a time span from the point where it is introduced into the piping containing the moving body (stream) of municipal or industrial waste sludge (time $t_o$) until the so-treated sludge is expected to have accomplished the purpose of solids-liquids separation, time $t_3$.

At the beginning, FIG. 1A, the sludge has no clear areas; it may be taken as completely opaque with a heavy burden of black or dark solids dispersed throughout.

At FIG. 1B, time $t_1$, the flocculant has commenced its work. A clear area of water appears and the solids (separated shaded areas) are being agglomerated, releasing trapped water which may have some natural turbidity shown by speckling in the unshaded area(s).

In FIG. C, (time $t_2$) the agglomeration has become more pronounced, and the area of free water enlarged.

According to FIG. 1D, the flocculant is assumed to have completed an effective role; the sludge has been finally broken down into discrete agglomerates (heavily shaded) separated by areas of clear water which, as noted above, may contain some slight turbidity. The areas of clear water are to be monitored in accordance with the present invention, and these areas are denoted HI for reasons apparent from the description to follow.

Figure 2:
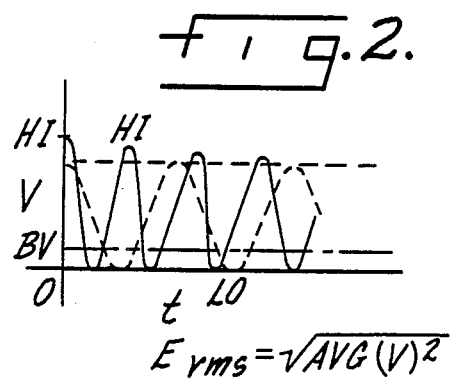
FIG. 2 is a diagram showing RMS prior art practice.

The most sophisticated method of monitoring known to us is the RMS method, FIG. 2. The vertical scale is voltage V, the horizontal is time t. The untreated sludge will reflect a zero voltage value when the above described probes are employed, but when the flocculated sludge is monitored, a voltage (continuous analog) wave is the result, shown here as a symmetrical sine wave, and although the actual wave may be more complicated, it will nevertheless exhibit repeated high crests or peaks (HI) and low dips (LO). An RMS-to-DC converter chip translates the waveforms into the root mean square value of the HI and LO voltages, the equation being shown in FIG. 2 as $E_{rms}$ equal to the square root of the average of the square of the voltages. The RMS value is then transformed to a DC voltage taken as an indicator of the effectiveness of the flocculant and compared to what the theoretical value should be for that species of flocculant applied to the particular sludge over the allowable time span of flocculant performance. However, there is a flaw for the case of dark sludges where the light fluctuations are large compared to the average transmitted light intensity in that natural turbidity, which need not be corrected, influences and distorts the curve, which is to say that the natural turbidity has resulted in a lower reading of the RMS values, so that in practice more of the expensive flocculant is called for than needed. There may also be a flawed read-out due to an unexpected low flow rate, causing a low frequency detector voltage output waveform for the reason mentioned above.

It may now be noted, as a lead in to the present invention, that in FIG. 2, the dashed line and dashed waveform indicate the voltage reduction caused by natural turbidity. Thus, the natural turbidity induces a lower RMS. It can therefore be seen that the noted reduction in voltage does not affect the HI voltage under the present method and does not cause inaccuracies.

Figure 3:
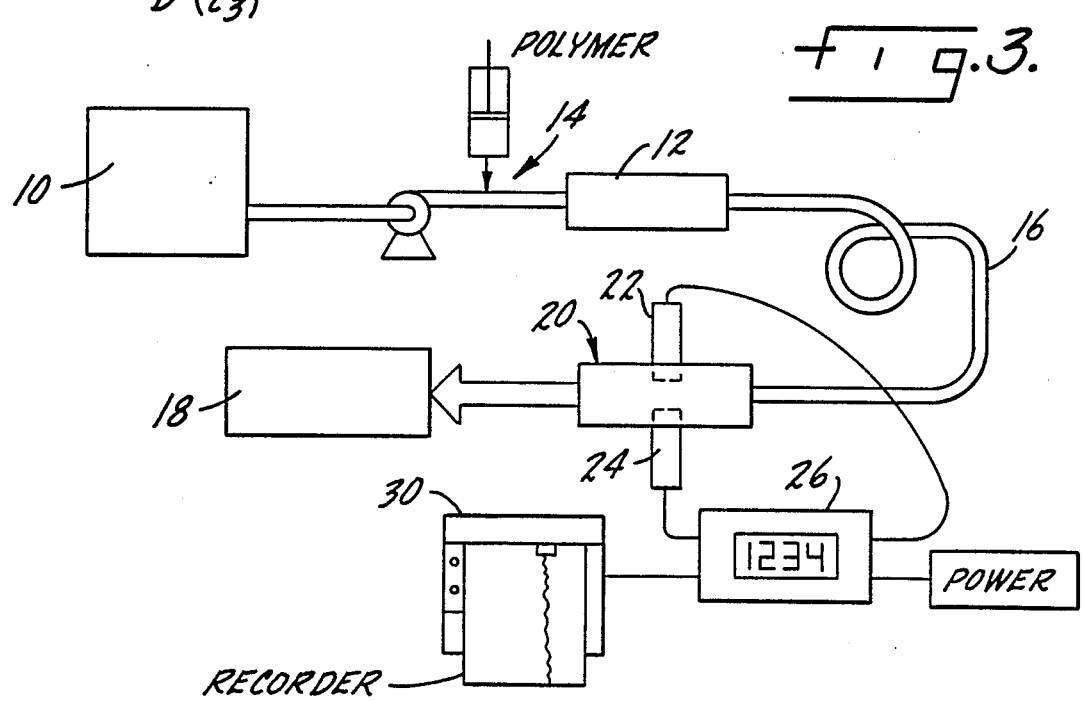
FIG. 3 is a schematic view of the present invention as it may be practiced.

FIG. 3 is a schematic view of the present invention in practice. The untreated sludge in a tank 10 is pumped to a gentle mixer 12 where the polymer, introduced by metering at 14, is effectively distributed to commence flocculation.

The piping 16, leading from the mixer to the dewatering equipment 18, is shown as a delay loop, allowing time ($t_0$–$t_3$, above) for the flocculant to act before reaching the dewatering equipment. The dewatering equipment is usually a so-called belt press; the cake is collected on the belt and the water flows through the interstices of the belt.

Our sensor module is identified by reference character 20. The two probes 22 and 24 will be detachably inserted into the sludge pipe and spaced apart, in opposition, by an optimum distance. Probe 22 emits through its optical window a high intensity light beam (preferably laser) aimed directly, crossstream, at the window of the optical detector probe 24. The detector incorporates a known transducer (photodiode +Op Amp) which transforms the quality of the received beam into a voltage waveform, as heretofore, but under the present invention we obtain a digital read-out, 26. We also record the corresponding voltage analog wave at a recorder 30 for future reference.

Figure 4:
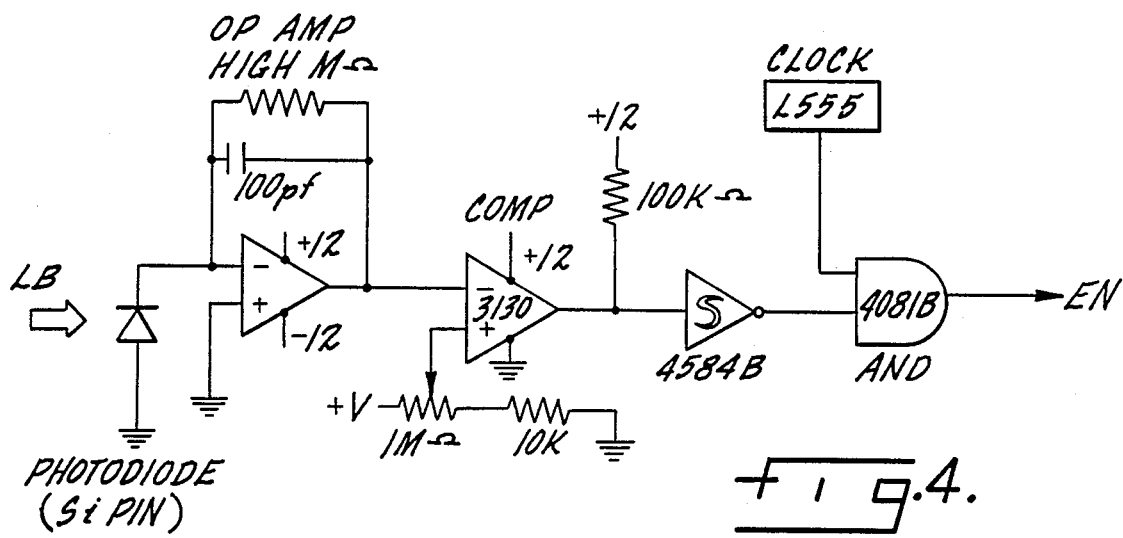
FIG. 4 shows the preferred circuitry under the present invention.

The light emitting probe 22 preferably incorporates a laser beam source, but an equivalent high intensity light beam may of course be used. This beam, crossing the stream of sludge, is shown by the bold arrow in FIG. 4, impinging on the photodiode and Op Amp which produce the voltage waveform analog of the beam quality or intensity.

The output of the Op Amp is delivered to a comparator (COMP) which is biased by a variable resistor (1 M+10K) to eliminate any dark voltage equivalent of the photodiode./amplifier, and its output is a series of digital pulses (not continuous wave) characterizing the HI clear water areas passing the beam per unit of time.

Figure 5:
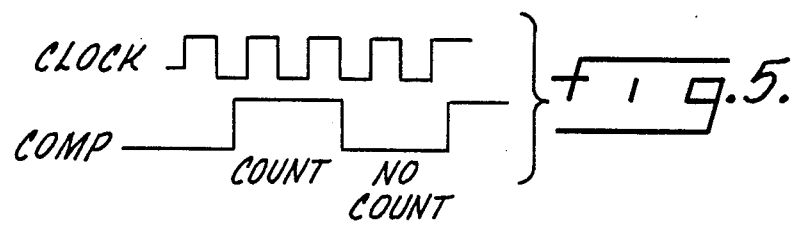
FIG. 5 shows clocked counting.

The HI pulses thus formed in series are then delivered to an AND gate which also receives timed (HI) signals from a CLOCK. As long as the AND gate receives HI pulse counts from the comparator coincident with HI pulse inputs from the CLOCK (FIG. 5) the AND gate emits pulses. In FIG. 5 the symbol EN identifies the clock pin contained in counter 26, FIG. 3, whereby the clear area count is displayed.

As noted above the bias on the comparator COMP is adjustable.

Figure 6:
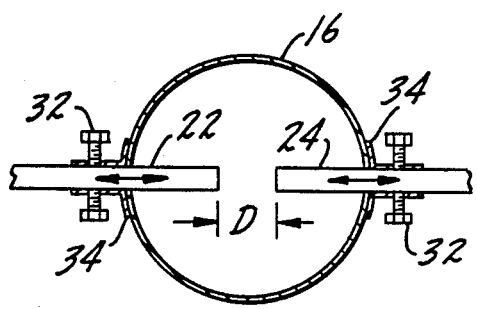
FIGS. 6 and 7 are detail views showing features of the present invention.

The probes are inserted into the sludge stream through (sealed) apertures in the pipe as 16, FIG. 6. The probes are adjustable so the separating distance D may be an optimum regardless of pipe diameter. The adjustment means may be nothing more than suitable set screws 32 supported by flanges or lugs 34 fastened to the opposite sides of the pipe 16.

Figure 7:
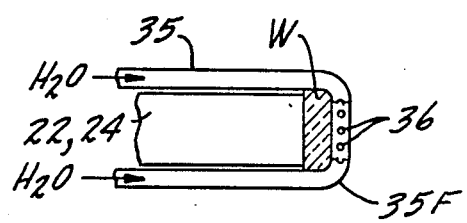

To limit fouling of the inner end window W of each probe, FIG. 7, each probe may be contained within an outer concentric, hollow tube 35 having at its window end a circular lip 35F embracing a bit of the outer perimeter of the window W in a sealed relationship. Each lip is formed with jet openings 36 so that intermittently water under higher pressure may be admitted and jetted across the faces of the windows W to wash them. This can be done intermittently without disturbing the monitor since the wash job can be anticipated.

We claim:
1. A method of determining the effectiveness of a flocculant to collect suspended particles into larger agglomerates separated by clear water areas in a moving body of an aqueous sludge, in which effectiveness is proportional to the ratio of clear water areas to agglomerate areas, comprising the steps of
  employing a probe to transmit a light beam through the moving body to a sensor probe incorporating a transducer which converts the intensity of the light beam to a voltage analog waveform having high (HI) peaks for clarified water areas crossed by the beam and low (LO) dips for agglomerates passing through the beam;
  transmitting the analog waveform to a comparator having a low voltage threshold bias resulting in a series of digitized output pulses corresponding only to the HI wave pulses; and counting HI wave pulses per unit of time to determine the effectiveness of said flocculant in forming said agglomerates.

2. Method according to claim 1 in which the probes are inserted into a pipe which contains the aqueous sludge, each probe having a window immersed in the sludge respectively to pass the beam and to receive it, and including the step of intermittently dashing clean water across the windows to clean them.

3. Method according to claim 2 in which the probes are adjustably mounted for optimum separation in respective apertures in a pipe which conducts the sludge.

4. Method according to claim 1 in which the probes are adjustably mounted for optimum separation in respective apertures in a pipe which conducts the sludge.

5. A method according to claim 1 in which the transducer includes a photodiode and an operational amplifier, the wave output of the transducer being transmitted to a comparator which transforms the high peaks of the waveforms, corresponding to clear water areas, into digital pulses, and clocking said discrete pulses as a measure of the rate of clear water areas moving past the probes.

6. Apparatus to determine the effectiveness of a flocculant to collect suspended particles into larger agglomerates separated by clear water areas in a body of aqueous sludge moving through a pipe and comprising:
- a light emitting probe positioned at one side of the pipe and extending thereinto;
- a sensor probe opposed to the light emitting probe, positioned on the opposite side of the pipe and extending thereinto to intercept an intense beam of light passing through the moving body of sludge in the pipe;
- an operational amplifier and photodiode coupled thereto, together positioned in the sensor probe to sense the intensity of passing light and convert the intensity spectrum into a continuous wave voltage output;
- a comparator to convert the voltage output into digital high voltage pulses for transmittal to an AND gate component as pulses corresponding to clear water areas;
- a clock for emitting regular timed high voltage pulses to said AND gate component;
- an gate component for receiving the high voltage output pulses of the comparator and clock, emitting output pulses only when the high voltage pulses from the comparator are coincident with the high voltage pulses of the clock and means for displaying the emitted output pulses to determine the effectiveness of said flocculant in forming said agglomerates.

* * * * *

UNITED STATES PATENT AND TRADEMARK OFFICE
CERTIFICATE OF CORRECTION

PATENT NO. : 4,976,871
DATED : December 11, 1990
INVENTOR(S) : Rodney H. Banks and Jitendra A. Shah It is certified that error appears in the above—identified patent and that said Letters Patent is hereby corrected as shown below:

Column 2, line 1, "s" should read --so--.

Column 6, line 22, after "an" insert --AND--.

Signed and Sealed this

Fifth Day of November, 1991

Attest:

HARRY F. MANBECK, JR.

*Attesting Officer*  *Commissioner of Patents and Trademarks*